United States Patent [19]

Clark

[11] Patent Number: 4,637,081
[45] Date of Patent: Jan. 20, 1987

[54] FOLD-DOWN SEAT CONSTRUCTION

[75] Inventor: Richard N. Clark, Farmington Hills, Mich.

[73] Assignee: Tecla Company, Inc., Mich.

[21] Appl. No.: 757,330

[22] Filed: Jul. 22, 1985

[51] Int. Cl.$^4$ .............................................. A47C 17/06
[52] U.S. Cl. ...................................... 5/18 R; 5/37 R; 5/37 C; 5/47; 297/65; 114/363
[58] Field of Search .................... 5/17, 18 R, 19, 20, 5/21; 104/109; 114/188, 363; 297/63, 64, 65

[56] References Cited

U.S. PATENT DOCUMENTS

| | | | |
|---|---|---|---|
| 3,162,481 | 12/1964 | Gaylor | 297/65 |
| 3,379,471 | 4/1968 | Dalziel | 114/363 |
| 3,394,417 | 7/1968 | O'Link | 114/363 |
| 3,884,522 | 5/1975 | Arima | 114/363 |
| 3,932,902 | 1/1976 | Belk | 297/65 |

OTHER PUBLICATIONS

"Sea Ray-Back to Back, 260 & 270 Model Slides and Rails", Blueprint, Tecla Co., 2455 W. Maple Rd., Walled Lake, MI 48088.

Primary Examiner—Carl D. Friedman
Assistant Examiner—Dan W. Pedersen
Attorney, Agent, or Firm—Barnes, Kisselle, Raisch, Choate, Whittemore & Hulbert

[57] ABSTRACT

An articulated back-to-back fold-down chair seat and side-rail track construction wherein the seats are mounted on slides which telescopically engage associated rails affixed to a chair platform support. The rails and slides have an interfitting cross-sectional configuration. Each seat has a stop with a dependent leg protruding downwardly within the confines of the platform to limit the movement of the chair in the fold-down couch position.

10 Claims, 14 Drawing Figures

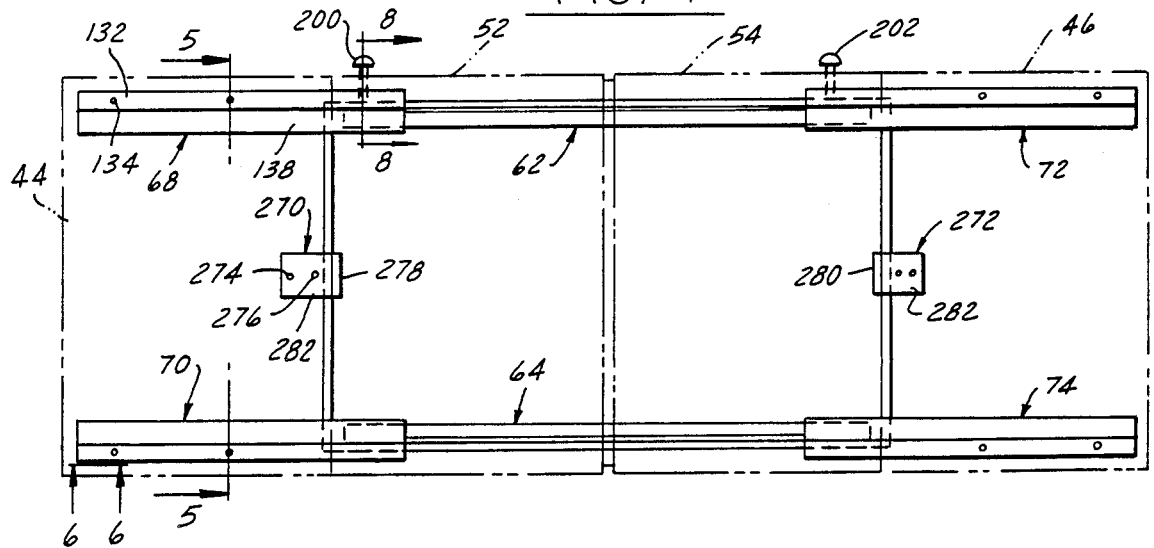
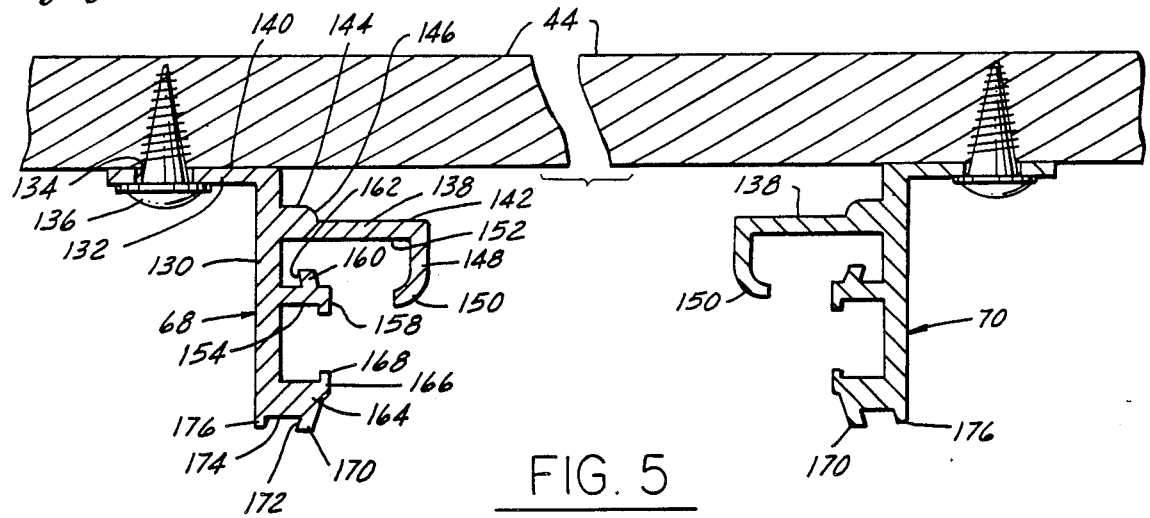
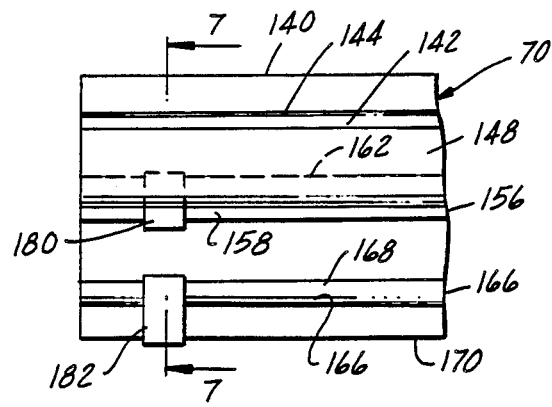
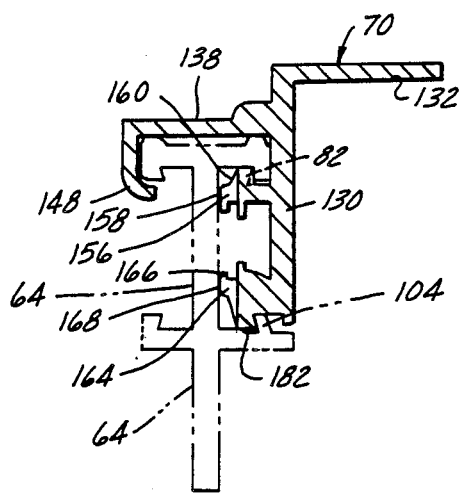

FOLD-DOWN SEAT CONSTRUCTION

This invention relates to articulated back-to-back fold-down chair seats of the type used in the recreational boat and recreational vehicle fields, and, more particularly, to improvements in the construction of the seat tracks used in such seat constructions.

Back-to-back chair seats of the fold-down type have become popular in the small boating field, particularly in boats ranging from fifteen to thirty feet in length and designed as speedboats and runabouts adapted for water skiing, fishing and the like. Such seats comprise two chair seats arranged back-to-back and articulated by hinge connections so as to be adjustable between an upright position providing back-to-back seating and an extended flat couch position for sunbathing and the like. Customarily two such chair seats are provided in an open runabout, one on either side of the open interior of the main cockpit of the boat, leaving an aisle space between the seats down the center of the boat. In their upright position this layout thus can provide two forwardly-facing chair seats, one for the helmsman driver and the other for a passenger alongside the driver, and two rearwardly-facing chair seats for two additional passengers.

Various types of sliding track and linkage constructions have been employed to provide the articulation and adjustable support for such back-to-back chair seats. One preferred type is a slide track construction which consists of two rails fixed one to each of the sides the stationary platform of the seat, and a pair of slides mounted one on each rail for fore and aft movement therealong toward and away from one another. The horizontal seats of the back-to-back chair are fixedly mounted on the slides. The chair backs are hingedly interconnected at the top of the chair back, and the chair backs are individually hingedly interconnected with the associated chair seat.

With this construction the slides of the chair may be moved together into abutment and releasably locked by a spring clip latch to hold the fore and aft chair backs in a fully upright position. Releasing the spring clip latch allows the slides to separate so that the seats may be spread apart and the chair backs folded down into the flat couch position. In this position the slides extend beyond the fore and aft ends of the track, but remain engaged with the track to provide a cantilever support for the extended chair seats to support the weight of a person seated or standing on the folded-down extended couch seat. With the slides latched together the chair seat can be adjusted forward and backward for a limited distance to provide arm reach adjustment for the driver relative to the boat steering wheel. Adjusting knobs are also provided to lock the seat in place after fore and aft adjustment along the track. These knobs also can be released and re-locked to vary the inclination of the chair backs. Although said slide-rail track construction is the most expensive to manufacture, it provides the greatest variety of chair and couch adjustments and is rugged enough to withstand lift-up forces in rough water as well as the other shocks and vibrations encountered in typical speedboat and runabout operation.

An object of the present invention is to provide an improved back-to-back articulated chair construction of the aforementioned slide-rail track type.

Another object is to provide an improved slide-rail seat track construction for such back-to-back chairs which is of equal or better strength than that heretofore provided while at the same time lower in weight and less expensive to fabricate, reliable in operation, easy to adjust and less likely to jam or stick in the action of the track.

Other objects, as well as features and advantages of the present invention, will become apparent from the following detailed description taken in conjunction with the accompanying drawings, which are scaled from a successful working embodiment, and wherein:

FIG. 4 is a horizontal plan view of the platform, rails and slides of the chair construction taken on the line 4—4 of FIG. 3 with the back and seat structures indicated only in phantom outline;

FIG. 5 is a fragmentary vertical cross sectional view taken on the line 5—5 of FIG. 4;

FIG. 6 is a fragmentary side elevational view taken on the line 6—6 of FIG. 4 and enlarged thereover to illustrate detail;

FIG. 7 is a vertical cross sectional view taken on the line 7—7 of FIG. 6, with the associated rail shown in phantom;

Figure 1:
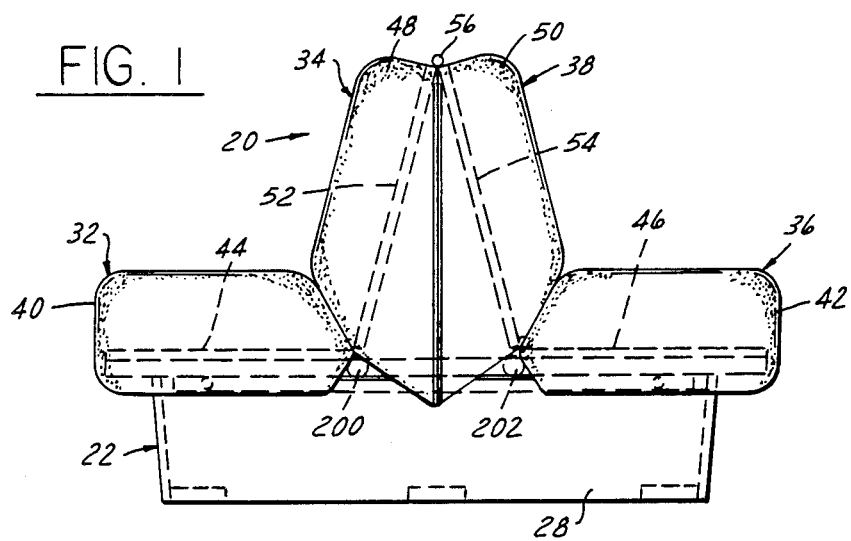
FIG. 1 is a side elevational view of a back-to-back fold-down boat chair seat constructed in accordance with the present invention and with the seat backs locked in their fully upright position.
Figure 2:
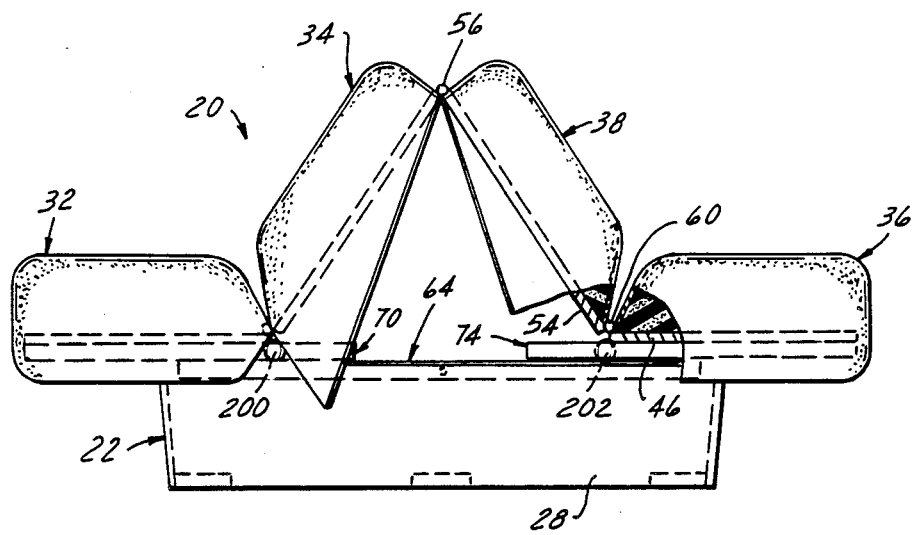
FIG. 2 is a side elevational view illustrating the back-to-back chair of FIG. 1 with the seat slides unlatched and the seats spread apart and locked into an intermediate position by use of track lock knobs, a portion of the right-hand seat and back being broken away to illustrate detail.
Figure 3:
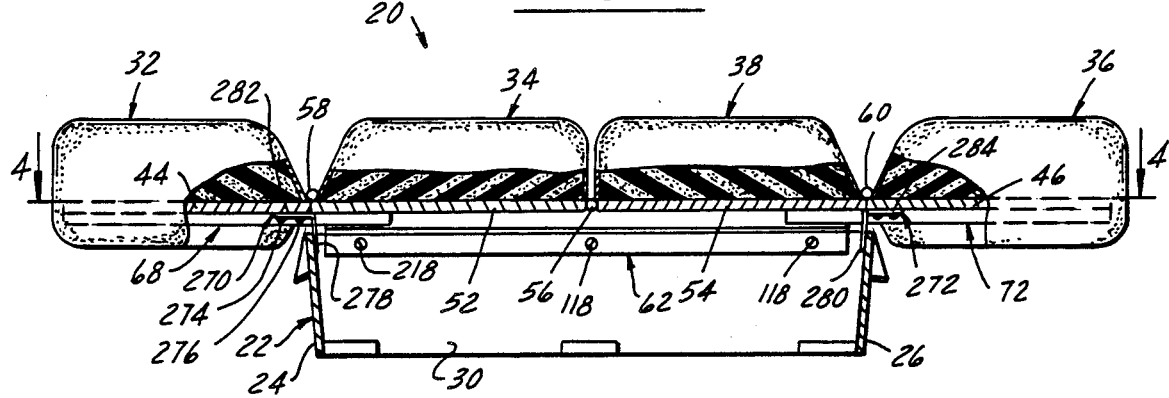
FIG. 3 is a side elevational view of the chair seat of FIG. 1 shown folded down into the extended flat couch position wherein the backs as well as the seats are horizontally oriented.

Referring in more detail to the accompanying drawings, an exemplary, but preferred, embodiment of a fold-down back-to-back boat chair 20 constructed in accordance with the present invention is shown in latched, full upright position in FIG. 1, partially folded down and locked into an inclined position in FIG. 2, and fully folded down to a flat couch position in FIG. 3. Chair 20 includes a base or platform box 22 of conventional construction typically made up of plywood to form a four-sided box open at its top and bottom. Base 22 thus has a front wall 24, rear wall 26 and side walls 28 and 30, and is suitably adapted to be fastened by screws or the like to the cockpit or cabin sole of the boat (not shown). Chair 20 also is provided with a conventional back and seat construction comprising what will be termed a front seat 32, a front seat back 34, a rear seat 36 and a rear seat back 38. Seats 32 and 36 each have suitable conventional cushions 40 and 42, respectively, which may comprise a vinyl covered foam upholstered onto a plywood backboard 44 and 46, respectively. Likewise, seat backs 34 and 38 have cushions 48 and 50 of vinyl-covered foam upholstered to associated backboards 52 and 54, respectively. The upper edges of boards 52 and 54 are articulated by a suitable hinge connection 56, and the backboards 52 and 54 are articulated at their lower edges to their associated seat boards 44 and 46 by hinges 58 and 60 (FIG. 3).

The improved seat slide-rail track construction of the present invention as adapted for chair 20 comprises a pair of rails 62 and 64 (FIGS. 3, 4, 7, 8 and 10) which are secured to side walls 30 and 28, respectively, of platform 22 by mounting the rails onto horizontally extending stringer members 66 (FIG. 8) affixed to the inboard sides of the respective side walls, as explained in more detail hereinafter. The seat track construction also includes four slides 68,70,72,74 which telescopically engage and slide on their associated rails, as best seen in FIGS. 7 and 8.

Figure 8:
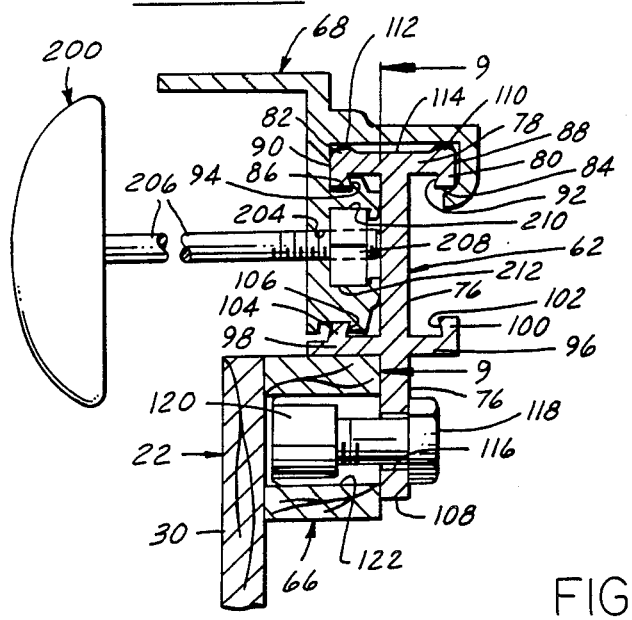
FIG. 8 is a vertical cross sectional view taken on the line 8—8 of FIG. 4.

In accordance with one important feature of the present invention, rails 62 and 64 as well as slides 68, 70, 72 and 74 are formed from aluminum extrusions in two basic geometric cross sectional configurations, namely, a rail configuration and slide configuration as best seen in FIGS. 5-10. The individual rail pieces 62 and 64 and slide pieces 68-74 are cut to predetermined length from their respective extrusion shapes and suitably machined as necessary to provide the various structural features described in more detail hereinafter. FIGS. 7 and 8 best illustrate the cross sectional configuration of the rails 62 and 64, each of the rails 62 and 64 being identical and reversible so that either may be used for a port or starboard installation.

Referring in detail to FIG. 8, rail 62 comprises a T section beam having a central upright or vertical web 76 integrally joined at its upper edge to a T-head flange 78. Leg portions 80 and 82 are dependent from the opposite outer side edges of flange 78. The respective bottom surfaces 84 and 86 of legs 80 and 82 are formed parallel to the plane of flange 78, and the outer surfaces 88 and 90 of legs 80 and 82 are formed parallel to the major axis (in cross section) of web 76. Legs 80 and 82 along their inboard sides are formed with convergent surfaces 92 and 94 inclined inwardly and downwardly at an angle of 15° to the aforesaid major axis of web 76.

Rail 62 has a pair of oppositely extending coplanar side flanges 96 and 98 protruding outwardly at right angles from the associated opposite sides of web 76 at a given distance below T-flange 78, preferably slightly below the mid-point of web 76. Flange 96 has an upright leg portion 100 at its outer edge with an inclined surface 102 tapering upwardly and inwardly at an angle of 15° relative to the aforementioned major axis of web 76. The opposite side flange 98 extends outwardly a greater distance than flange 96 (for example, 0.500" versus 0.300"). Flange 98 has an upstanding leg portion 104 with an inclined inboard surface 106 inclined inwardly and upwardly at an angle of 15° to the aforementioned major axis of web 76. Surfaces 102 and 106 of legs 100 and 104 are equally spaced from the associated side surfaces of web 76, as are the inclined surfaces 92 and 94 of upper legs 80 and 82. Web 76 terminates at a lower edge 108 spaced (e.g., in one working embodiment, 0.900") below the lower surface of flanges 96 and 98.

The T-flange 78 of rail 62 has a pair of flat bearing surfaces 110 and 112 running along the outer edges of its upper surface vertically opposite surfaces 84 and 86 defining therebetween a groove or trench surface 114 spaced vertically below surfaces 110,112 by a predetermined distance, for example, 0.040" in one working embodiment, but preferably about 0.020".

Each rail 62,64 is provided with mounting holes 116 which extend through web 76 between its bottom edge 108 and the mid-flange 96-98, of suitable spacing and number, e.g., there being three such holes in the working embodiment illustrated herein. Each mounting hole receives a hex head mounting stud 118 (FIGS. 8 and 3) which is threadedly received in a threaded socket 120 embedded in a bore 122 of the wood framing member 66 (FIG. 8). As best seen in FIGS. 3 and 8, rail 62 is adapted to lay against the inboard corner of member 66 with flange 98 seated flat on the upper face of member 66 and the vertical face of web 76 beneath flange 98 seating flat against the vertical inboard face of member 66. If necessary, shims may be provided to align rail 62 and rail 64 in parallelism with one another in conjunction with securement of the rails to associated frame members 66. However, such shimming is usually not necessary due to the allowance of a predetermined clearance provided between each rail 62,64 and its associated slide in the horizontal direction as viewed in the drawings and explained in more detail hereinafter.

Once rails 62 and 64 are so mounted in parallelism on platform 22, the associated slides 68 and 72 are inserted inboard end first over the opposite longitudinal ends of rail 62 and slid toward one another thereon, the same procedure being followed for slides 70 and 74 associated with the rail 64.

Referring to FIGS. 5-10, each of the slides 68,70,72,74 is identical in cross sectional configuration and dimension, and may be turned end for end to accommodate the port and starboard orientations of the slides as illustrated in FIG. 5. Referring to slide 68 in FIG. 5, the same is made as an aluminum extrusion to provide a precise and predefined geometric cross sectional configuration for telescopic sliding engagement with its associated rail 62, as shown in FIG. 8. Thus, slide 68 has an inverted L-shaped beam section to provide a main body or vertical web 130 integrally joined at its upper edge to a horizontal mounting flange 132. An appropriate number and spacing of screw holes 134 are provided in flange 132 which receive therethrough suitable wood screws 136 for attaching the backboard 44 or 46 of seats 32 or 36 onto slide 68.

Slide 68 also has a main bearing flange 138 which projects horizontally from web 130 oppositely from mounting flange 132 at a predefined distance spaced below the upper surface of flange 132, for example, 0.340" as measured between the top surface 140 of flange 132 and the top surface 142 of flange 138. This vertical offset provides clearance between boards 44,46,52,54 and flange 138 for fasteners and leaves of the chair hinges 58 and 60. At the junction of flange 138 with web 130 a stiffening fillet 144 is provided which may be, in one working example, 0.250" in horizontal dimension and 0.09" in vertical dimension, the outer corner being rounded with a radius of curvature 146 of say 0.100". The outer free edge of flange 138 has dependent therefrom a grip flange 148 having an in-turned bottom edge 150. The under surface 152 of flange 138 is made flat and parallel to the surface 142 and is adapted to slideably ride on the raised bearing surfaces 110,112 of rail 62, as shown in FIG. 8.

Slide 68 has a sub-flange 154 extending horizontally from web 130 beneath flange 138 coplanar with the in-turned end 150 of grip flange 148. Sub-flange 154 terminates at its free edge in a downwardly dependent leg portion 156 having an outer vertical face 158 adapted to bear against the ouboard side of web 76 of rail 62 (FIG. 8). Sub-flange 154 has an up-standing inclined rib 160 with an inner face 162 inclined inwardly and upwardly toward the vertical axis of web 130 at an angle of 15° to mate with the inclination of surface 94 of rib 82 of rail 62.

Slide 68 also has a lower flange 164 protruding horizontally from the same side of web 130 as the sub and main flanges 154 and 138. Lower flange 164 terminates in an upwardly protruding rib 166 vertically opposed to rib 156 and has an outer face 168 coplanar with face 158 also adapted to slideably abut the outboard face of web 76 of rail 62 (FIG. 8). Sub-flange 154 has a downwardly and inwardly inclined rib 170, the interior face 172 of which is inclined at an angle of 15° downwardly and inwardly toward the vertical axis of web 130 to slideably mate with the surface 106 of rib 104 of rail 62 (FIG. 8). The bottom surface 174 of lower flange 164 is spaced a predetermined distance below surface 152 of flange 138 and is bounded by a small vertical rib 176.

It is to be understood that slide 70, as well as slides 72 and 74, are identical in configuration and dimensions to slide 68 described above, slide 70 being turned end-for-end in assembly and use as shown in FIG. 5 to provide a mirror image of slide 68 for the respective port and starboard installations of rails 62 and 64.

Referring to FIGS. 6 and 7, another feature of the present invention is the provision of slide stops which keep the seats 32 and 36 and associated slides from coming off of the rails 62 and 64 when the seats are folded up to the full upright position shown in FIG. 1. Referring to FIGS. 6 and 7, each of the slides adjacent its outer free end (relative to its associated rail in assembly) is die struck to coin vertically aligned portions of slide ribs 160 and 172 and in associated flanges 154 and 164 into pushed-back upset portions 180 and 182, respectively, (FIG. 7). The offset of this material toward web 130, as best seen in FIG. 7, provides upper and lower interfering abutments against which the forward ends of associated rail ribs 82 and 104 of rails 64 and 62 will strike when slides 70 and 68 are almost completely telescoped onto the associated tracks 64 and 62, thus establishing the rearward limit of chair fore and aft adjustment. Likewise, the corresponding die struck stops of slides 74 and 72 will abut the rearward ends of ribs 82 and 104 of rails 64 and 62 when slides 74 and 72 are almost completely telescoped onto tracks 64 and 62, therby establishing the forward limit of chair adjustment. Preferably, the die strucks 180 and 182 are die formed at the extreme ends of the associated slides, rather than being longitudinally inset therefrom as shown in FIG. 6, in order to minimize the length of the slide and thereby save material.

Figure 9:
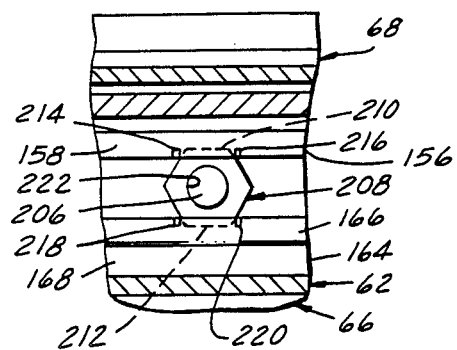
FIG. 9 is a vertical fragmentary cross sectional view taken on the line 9—9 of FIG. 8.

A further feature of the present invention is the improvement in the structure for the mounting of the locking knobs 200 and 202 shown in phantom in FIGS. 1 and 2, in plan view in FIG. 4, and in enlarged detail in FIGS. 8 and 9. Locking knobs 200 and 202 are preferably mounted in the slides 68 and 72 at the outboard side of the chair seat 20 and adjacent the inner ends of the slides. Referring to FIGS. 8 and 9, web 130 of slide 68 is provided with a die-punched through-hole 204 adapted to receive with a close fit the shank 206 of knob 200. A standard stainless steel hex head nut 208 designed to have a sliding fit of its top and bottom hex faces 210 and 212 with the associated facing surfaces of flanges 154 and 164, and of its side faces between and with the inboard side of web 130 and the inner faces of ribs 156 and 166. Thus, nut 208 can be slideably inserted into the open end of the channel in the slide defined by these portions of the slide structure, and then slide therealong until the threaded center hole of nut 208 registers with the hole 204 in web 130. The nut is then captured in this location by die striking inwardly offset crimps 214 and 216 (FIG. 9) in flange rib 156, adjacent the end of the hex nut top surface 210 and inwardly offset crimps 218 and 220 at the adjacent ends of the bottom hex face 212 of nut 208, thereby securely locking nut 208 in the slide channel in registry with the knob hole 204.

Knob shank 206 then may be inserted through hole 204 and its threaded end screwed into the threads 222 of nut 208 until the free end of shaft 206 abuts the outboard face of web 76 of the associated track 62, as shown in FIG. 8. Further threading of shaft 206 will force slide 68 to the left as viewed in FIG. 8, thereby causing slide ribs 160 and 170 (FIG. 5) against track ribs 82 and 104, respectively, so that the inclined surfaces 162 and 172 of ribs 160 and 170, respectively, frictionally grip the inclined surfaces 94 and 106 of track ribs 82 and 104 to thereby lock slide 68 in any adjusted position along associated track 62. It will be understood that slide 72 and its associated lock adjustment knob 202 have the identical slide mounting structure and cooperate with associated track 62 in the same manner. Accordingly, front seat 32 and its associated back 34 may be slid forward by releasing knob 200 while knob 202 remains locked to keep the back seat 36 and back 38 upright. In addition, both seats may be moved to an inclined position as illustrated in FIG. 2, for example, by using both knobs 200 and 202. Likewise, the seats may be locked in the couch position of FIG. 3 using knobs 200 and 202.

Figure 10:
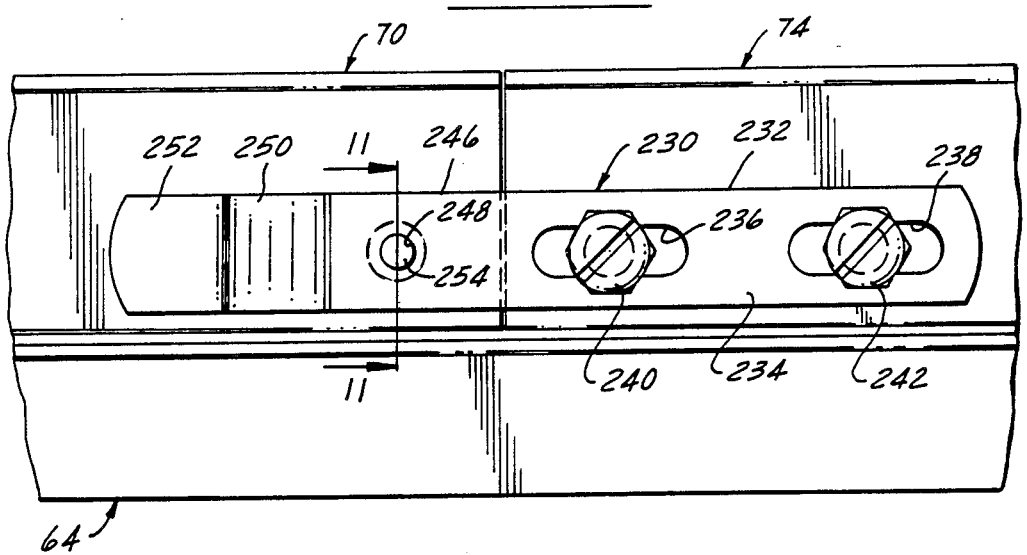
FIG. 10 is a fragmentary side elevational view of a rail and a pair of associated slides with their inner ends abutted and locked together by a spring clip latch of the chair construction.
Figure 11:
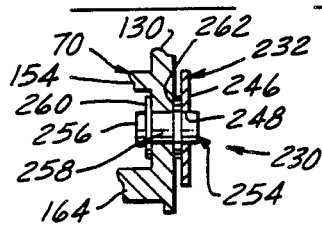
FIG. 11 is a fragmentary vertical cross sectional view taken on the line 11—11 of FIG. 10.
Figure 12:
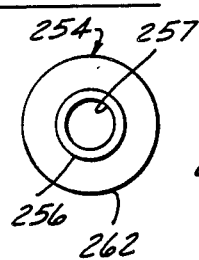
FIG. 12 is an end elevational view of the shoulder rivet of the latch construction of FIGS. 10 and 11 shown by itself.
Figure 13:
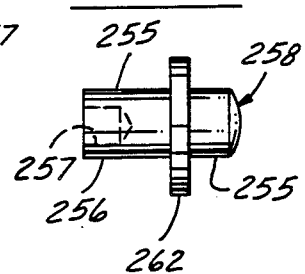
FIG. 13 is a side elevational view of the shoulder rivet of FIG. 12.
Figure 14:
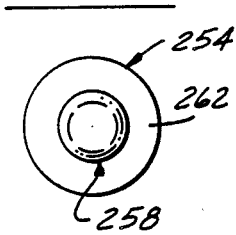
FIG. 14 is an end elevational view of the shoulder rivet of FIG. 13 illustrating the end opposite to that of FIG. 12.

Still another feature of the present invention is the improvement in the spring clip latch structure illustrated in FIGS. 10 and 11. Latch 230 comprises a spring steel strip 232 having a flat portion 234 adapted to lay against the outboard side of slide 74. Strip flat 234 is provided with two elongated slots 236 and 238 through which machine screws 240 and 242 are inserted to fasten strip 232 securely to slide 74. The aforementioned interior channel space of slide 74, i.e., the space defined between sub-flange 154 and lowermost flange 164, their associated ribs 156 and 166 and web 130, is again used in the same manner as with the adjustment knob nuts 208 described in conjunction with FIGS. 8 and 9 to retain a pair of plated steel hex nuts (not shown) which are registered individually with holes punched in slide 74 in the manner of hole 204 of slide 68. These nuts are also staked in place by four crimps each identical to the crimps 214-220 described in conjunction with FIG. 9 relative to nut 208. The shank of studs 240 and 242 is inserted through the punched holes and the threaded ends thereof are threaded into these associated hex nuts to clamp latch strip 232 tightly to slide 74.

Latch strip 232 has an inwardly curved portion 246 provided with a latch hole 248 and a portion 250 provided with a curvature away from the plane of the flat portion 234 and outwardly of the seat, and terminates in a finger grip tab portion 252 adapted to be spaced outwardly from the associated slide 70 by about ⅛". Thus, when the two slides 70 and 74 are brought together into end-to-end abutment as shown in FIG. 10, the curved portion 250 of slip 232 will ride over a keeper pin 254 to cam portion 246 outwardly with a yieldable flexing action until pin 254 registers with hole 248. The portions 252, 250 and 246 will then resiliently snap back to bring portion 246 against the side of associated slide 70 with pin 254 registered through hole 248 to lock slides 70 and 74 into the abutted position to thereby securely hold the seats 32–34 and 36–38 in the fully upright position shown in FIG. 1.

Referring to FIG. 11, the keeper pin 254 is mounted in associated slide 70 and consists of a specially formed shoulder rivet 254 initially made of constant diameter with a hollow end 256 (having a blind bore 257) so as to be insertable through a punched hole 258 in the web 130 of slide 70 opening into the channel between sub-flange 154 and bottom flange 164. A lock washer 260 is slipped over the inboard end 256 of rivet 254 and hollow end 256 is expanded by a rivet punch inserted in blind bore 257 to secure the inboard end of pin 254. The outer end 258 of pin 254 is separated from inner end 256 by an integral flange 262 to retain washer 262 relative to the outboard end of pin 254, thereby securing pin 254 to web 130 of slide 70.

Alternatively, keeper pin 254 may be constructed by using a conventional roll pin (not shown) made by rolling a flat sheet of metal into a tube having a longitudinal seam. The tube is inserted through hole 258 and into a threaded hex nut which is identical to nut 208 and received in the slide channel in a similar manner. The tube is then expanded to lock it to the nut threads, or the tube may be diametrically sized for press fit into the nut.

Yet another feature of the present invention is the improved seat stop construction shown in FIGS. 3 and 4. A pair of generally L-shaped aluminum sheet metal stops 270 and 272 are each fastened by a pair of screws 274 and 276 to the underside of the associated seat boards 44 and 46 of chair seats 32 and 36, respectively. Each stop 270 and 272 has a dependent leg 278 and 280, respectively, extending downwardly and at a slight incline with an included angle of about 100° between it and the associated mounting legs 282 and 284 of stop 270 and 272, respectively. Stops 270 and 272 are positioned centrally along the inner edges of bottom boards 44 and 46, respectively, so that legs 278 and 280 abut or have a slight clearance with the front and rear walls 22 and 26 of the platform 22 when chair 20 is folded down to the couch position as shown in FIG. 3. Hence, stops 270,272 prevent fore and aft movement of the couch relative to platform 22 in the couch position independently of the adjustment knobs 200 and 202 should the user either forget or desire not to use the knobs to lock the chair in the couch position.

Among the many advantages of the invention, in addition to those stated previously, over the aforementioned commercial prior art slide-rail seat track construction and associated fold-down boat chair seat construction, are the fact the slide and rail geometry uses 32% less material and is less expensive to fabricate, yet the load capacity is the same or better than the previous design. The special configuration of the slides 68,70,72,74 provides a wrap-around gripping action on the associated tracks 62 and 64, but achieves this with a more open construction, i.e., gripping only the T-head 78 of the track, leaving a space between in-turned flange leg 150 and the rib 166 (FIGS. 5 and 8), thereby providing a weight and material savings. The channel configuration with ribs 160 and 170 cooperating with track ribs 82 and 104 adds to the resistance of the slide to a moment arm twisting action induced by the offset mounting of the seat boards on the mounting flange 132. In addition, the inclination of surfaces 162 and 172 of the slide ribs 160 and 170 cooperates with the inclination of the surfaces 94 and 106 of ribs 82 and 104 in conjunction with the operation of the adjustment lock knobs 200 and 202. When the knobs are tightened to lock the slides on the track these inclined surfaces are pushed together to provide the friction lock. The aforementioned inclination augments this locking action by providing a "double handshake" effect, enabling a smaller section of material to be used. This 15° dovetail angle of these mating parts causes the tab sets of the slide and rail to be pulled together during tightening. This results in less force being required than would be the case with right angle faces which would tend to bend the tabs away from each other.

Another important feature is the provision of the gusset rib 144 which adds strengthening material at the junction of flange 138 with web 130. This section geometry increases the slide beam shear strength with a minimum amount of material. The slide is further reinforced by making lower flange 164 approximately twice the thickness (vertical dimension as viewed in FIG. 5) as sub-flange 54, thereby further increasing the beam strength of the slide to resist bending about the vertical axis of the slide as well as about its horizontal axis. Additionally, the in-turned bottom edge 150 of grip flange 148 of the slide also increases the beam strength of the slide.

The improved slide-rail construction also provides a low friction sliding track so that less effort is required to move the chairs between their upright, intermediate and couch positions. This improved result is achieved by the bearing of the slide surface 152 of the two raised track portions 112 and 114 of tracks 62,64. The groove 114 in the center of the rail 62 is well adapted to hold grease or other solid lubricant for an extended period of time, and also provides a space for dirt or chips to be expelled from between the sliding surfaces. The open character of the slide extrusion section both laterally and at the ends also enables chips and dirt to be readily expelled.

The channel configuration of the slides 68–74, in addition to providing the load bearing and locking action described previously, also enables the use of the insert nuts 208 for the locking knobs 200 and 202 as well as for the spring clip studs 240 and 242. Through-holes punched in the slides are cheaper than drilled and machined threaded holes, and the insert nuts may be readily locked in place by crimping done in one press operation, thereby providing a less expensive construction to manufacture and also a more reliable thread securement for knobs 200 and 202 as well as studs 240 and 242. The crimping operation can also include the operation of forming the sliding stops 180 and 182 of FIGS. 6 and 7, further contributing to economy of manufacture.

Seat stops 270 and 272 are inexpensive to manufacture and install. When it is desired to install or remove the chair seats from the rails and platform, only one stop need be removed, requiring removal of the two screws 274 and 276. The associated seat may then be slid forward and its slides removed telescopically off of the associated tracks. The seat thus removed is then lifted so that its slides are clear above the tracks, and then slid backward until the slides of the other seat telescope off of the tracks. When the seats are in their intermediate position of FIG. 2 or folded up as in FIG. 1 and locked together with the spring latch 230, the stops 270 and 272 are adjacent one another. In this condition the slide stops 180 and 182 are disposed closely spaced from the associated ends of the tracks and serve to limit the fore and aft movement of the seat in this condition to a given range of movement consistent with driver arm reach adjustment.

The absence of drilled and tapped holes in the slides and track in favor of die punched holes also economizes manufacturing costs and reduces the amount of aluminum chips remaining on these parts during and after manufacturing. Such processing chips can be a serious problem with mating aluminum parts due to their susceptibility to galling.

The improved slide and rail track construction is also amphilical, allowing the slide to be assembled with its mounting tab or flange 132 on either the left or the right side off the associated rail. Hence this design feature allows the slide and rail to be used in many more configurations, thereby saving on inventory as well as the assembly costs.

A further feature of the present invention is the provision of a predetermined clearance dimension between the mating surfaces of each slide 68, 70, 72 and 74 and its associated rail 62, 64. In use, when the cantilever mounted slides are telescoped to the position to extend a maximum distance beyond the rails, as in the couch position of FIG. 3, they are subjected to maximum stress due to the leverage between the extended slide and associated track. It has been found from destructive testing that if a reasonably large gap or clearance is provided between each slide and associated track in both the horizontal and vertical axis as viewed in the drawings, the assembled slide and rail provide an assembly which will bear a larger load. For example in the slide and rail construction as shown in the drawings a clearance vertically ranging from 0.050 to 0.060" vertically, and the same range of clearance horizontally, will enable the slide and rail to still function telescopically and slidably relative to one another even after the slide has been over-stressed, thereby tending to form twist or kinks in the slide. Despite such abuse and deformation of the slide, the aforementioned extra clearance will permit continued operation with minimal binding. The oversized clearance between the slide and rail also assists in compensating for the wood parts of the platform 22 being out of parallel and thereby obviating the need for shims between the rails and platform. It has also been desirable to make the screw mounting holes 134 in slide flange 140 somewhat oversized relative to screws 136 to allow the slide and rail assembly to shift slightly under deformation loads to further minimize binding of the slide and rail assembly.

From the foregoing description it will now be apparent that a fold-down chair seat construction and slide-rail track assembly of the invention constructed in accordance with the foregoing disclosure fully achieves the aforestated objects and provides many advantages and improved results over the prior art. It will also be understood that, although the foregoing description and drawings describe and illustrate in detail one commercially successful working embodiment of the present invention, to those skilled in the art to which the present invention relates the present disclosure will suggest many modifications in construction as well as widely differing embodiments and applications without thereby departing from the spirit and scope of the invention. For example, the cross sectional configuration of the rails 62 and 64 may be modified by further extending outwardly the side flange 98 (FIG. 8) such that it will terminate generally flush with the outboard side of the associated side wall 28 or 30 to thereby provide a greater seating area of the rail on platform 22. Likewise, the cross sectional configuration of slides 68–74 may be modified by eliminating mounting flange 132 and the associated gusset 144 so that the top surface 142 of flange 138 extends all the way over to the left side of web 130 as viewed in FIG. 5. In this case flange 138 is extended horizontally to the right as viewed in FIG. 5 in a horizontal direction such that the horizontal dimension of flange 138 is approximately twice that of the configuration shown in FIG. 5. However when flange 148 remains in the same location as shown in FIG. 5. Such variations allow the slide and rails to be adapted to a wider variety of seat constructions. In addition, it is to be understood that the slide and rail assemblies can be mounted up-side-down or sideways relative to the orientation shown in the preferred embodiment illustrated in the drawings. Additionally, the slide and rail assemblies of the invention can be used on other types of seats or couches than the particular type of back-to-back fold-down boat seat construction illustrated herein. The present invention, therefore, is intended to be limited only by the scope of the appended claims and the applicable prior art.

I claim:

1. In an articulated back-to-back fold-down chair seat and slide-rail track construction having a pair of back-to-back chairs, each with a bottom board and backboard hinged at their mating ends and articulated at the upper abutment of the backs to operate between a full upright position, a fold-down couch position of the backs and seats and intermediate inclined positions therebetween, and wherein each of the seats are mounted on associated pairs of slides which telescopically engage associated first and second track rails affixed in laterally spaced apart relation to opposite sides of a chair platform support, the improvement wherein said rails each comprise an aluminum extrusion having in cross section an upright web integral with a T-head at its upper end and a pair of horizontally opposed flanges projecting oppositely from said web approximately midway between the upper and lower edges of said rail, and wherein said slides each comprise an aluminum extrusion having in cross section an upright web portion with a seat mounting flange integral with its upper edge and protruding horizontally therefrom upon which the seat bottom boards are mounted and a rail gripping flange protruding from said web in the opposite direction from said seat mounting flange and spaced horizontally therebelow, the underside of said gripping flange being adapted to slideably ride on the upper surface of the rail T-head in telescopic assembly of said slide and rail, said outer edge of said gripping flange having a dependent flange and inturned end adapted to wrap around and embrace the associated outer edge of said T-head of the rail, said slide also having vertically spaced flanges protruding from one side of said web adapted to slideably abut the adjacent side of said rail web between said T-head and said mid-flange thereof.

2. The chair and track construction set forth in claim 1 wherein said rail T-head has a pair of raised laterally spaced slide protrusions on its upper surface adapted for sliding engagement with the underside of said slide grip flange and defining a recessed groove therebetween for receiving lubricant.

3. The chair and track construction set forth in claim 1 wherein each said slide has a reinforcing fillet at the junction of said grip flange and web thereof on the side of said grip flange closest to said seat mounting flange.

4. The chair and track construction set forth in claim 1 wherein said T-head of each said rail has a pair of dependent ribs one on each outer lateral edge thereof with inwardly inclined surfaces facing the associated side of said rail web, and said mid-flanges each has an upstanding rib portion vertically facing and juxtaposed to said T-head ribs, each of said rib portions having an inclined surface facing the respectively adjacent side of said web, the uppermost of said vertically spaced slide flanges having an inclined rib disposed with a sliding clearance with the one of the dependent ribs of said T-head closest to said slide, the lowermost of said vertically spaced slide flanges also having an inclined rib disposed with a sliding clearance with an upright rib provided on the associated rail mid-flange.

5. The chair and track construction set forth in claim 4 wherein the slides telescopically received on said first track rail are each provided with an adjustment knob lock construction comprising a threaded spindle with a knob on the outer end thereof and being mounted in the web of each slide so as to protrude through registering slide thread means such that the free end of the knob spindle can be screwed into abutting engagement with the facing side of said rail web tending to force the slide and rail apart to bring said slide flange ribs into frictional locking engagement with the associated rail T-head and mid-flange ribs.

6. The chair and track construction set forth in claim 5 wherein said vertically spaced slide flanges define therebetween a channel extending longitudinally of the slide and open at the opposite ends of the slide, said channel receiving therein a hex nut registering with a die punched hole in the web of said slide and being crimped in fixed position to provide said thread means, said locking knob spindle being inserted through said die punched hole and threadably received through said nut to provide thread engagement of said locking knob spindle with said slide.

7. The chair and track construction set forth in claim 5 wherein the slides received on said second track rail are provided with cooperative spring latch locking construction including a spring latch strip mounted on one end of one of said second rail slides and a keeper pin mounted to the adjacent end of the other of said second rail slides and adapted to have releasable locking engagement with said spring latch strip, said spring strip being secured by a pair of threaded fasteners inserted therethrough and through die punched holes in said other of said second rail slides, said other of said second rail slides having a pair of nuts, one registering with each of said threaded fasteners and retained by being crimped in place in a channel defined by and between said vertically spaced slide flanges.

8. The chair and track construction set forth in claim 1 wherein each of said slides has a crimped portion in said vertically spaced slide flanges projecting inwardly into a channel defined by and between said vertically spaced slide flanges and being disposed adjacent the outermost ends of said slides, said crimped in portions having an interferring obstruction abutment with associated portions of the ends of said rail.

9. The chair and track construction set forth in claim 8 wherein said chair platform support comprises a box-like structure open at its top and having side walls on which said rails are mounted and a pair of mutually facing end walls, and wherein a pair of angle bracket stops are affixed one to the underside of each of said seat boards adjacent the articulated connection to the associated seat back board, each of said stops having a dependent leg protruding downwardly within the confines of said chair platform support and adapted to respectively abut the associated end walls thereof to limit movement of said chair in the fold-down couch position thereof relative to said platform.

10. The chair and track construction set forth in claim 7 wherein said releasable spring latch construction includes a specially formed rivet pin inserted through said slide to serve as said keeper pin, a washer received over said rivet pin on the inboard side of the web of the associated slide, said rivet pin having a blind bore expanded on the inboard side thereof to lock the same against the associated inboard washer, said rivet pin having a flange adapted to lock it relative to the outboard side of said web to fasten said pin in place with one end protruding for engagement with said spring latch.

* * * * *